(12) United States Patent
Kami et al.

(10) Patent No.: US 8,173,304 B2
(45) Date of Patent: May 8, 2012

(54) ELECTRIC CURRENT COLLECTOR, ELECTRODE AND CHARGE ACCUMULATING DEVICE

(75) Inventors: Kenichirou Kami, Takahama (JP); Gen Suzuki, Kariya (JP); Junji Otobe, Okazaki (JP)

(73) Assignee: Denso Corporation, Kariya (JP)

( * ) Notice: Subject to any disclaimer, the term of this patent is extended or adjusted under 35 U.S.C. 154(b) by 1039 days.

(21) Appl. No.: 11/986,701

(22) Filed: Nov. 26, 2007

(65) Prior Publication Data

US 2008/0131779 A1    Jun. 5, 2008

(30) Foreign Application Priority Data

Nov. 27, 2006 (JP) .................................. 2006-318746
Mar. 28, 2007 (JP) .................................. 2007-085198
Oct. 24, 2007 (JP) .................................. 2007-276312

(51) Int. Cl.
*H01M 4/64* (2006.01)

(52) U.S. Cl. ......... 429/233; 429/237; 429/245; 429/209

(58) Field of Classification Search .................. 429/233, 429/234, 235, 237, 238, 245, 218.1, 223, 429/221, 224, 209, 231.1
See application file for complete search history.

(56) References Cited

U.S. PATENT DOCUMENTS

| | | | |
|---|---|---|---|
| 6,815,003 B2 | 11/2004 | Yagi et al. | |
| 7,327,556 B2 * | 2/2008 | Ro et al. | ........................ 361/502 |
| 2005/0233066 A1 | 10/2005 | Sunagawa et al. | |
| 2006/0171102 A1 | 8/2006 | Ro et al. | |
| 2006/0172134 A1 | 8/2006 | Ro et al. | |

FOREIGN PATENT DOCUMENTS

| | | |
|---|---|---|
| JP | 07-022606 | 1/1995 |
| JP | 07-226206 | 8/1995 |
| JP | 11-162470 | 6/1999 |
| JP | 2000-243383 | 9/2000 |
| JP | 2002-079466 | 3/2002 |
| JP | 2002-216747 | 8/2002 |
| JP | 2002-298853 | 10/2002 |
| JP | 2003-109582 | 4/2003 |
| JP | 2004-063156 | 2/2004 |
| JP | 2005-310502 | 11/2005 |
| WO | WO 2004/087984 | 10/2004 |

\* cited by examiner

*Primary Examiner* — Raymond Alejandro

(74) *Attorney, Agent, or Firm* — Harness, Dickey & Pierce, PLC

(57) ABSTRACT

The electric current collector of the present invention comprises a substrate composed of aluminum, a junction layer, formed on the surface of the substrate, in which aluminum and an electrically conductive material having electrical conductivity have been mixed, and an electrical conductor layer, formed on the junction layer, comprising the electrically conductive material. The electrode and the charge accumulating device of the present invention employ the electric current collector of the present invention.

21 Claims, 3 Drawing Sheets

ELECTRIC CURRENT COLLECTOR, ELECTRODE AND CHARGE ACCUMULATING DEVICE

TECHNICAL FIELD

The present invention relates to an electric current collector composed of aluminum, an electrode, and a charge accumulating device using them.

BACKGROUND ART

In recent years, environmental pollution has become a serious problem on a global scale, and exhaust gas from gasoline-driven automobiles is one source of air pollution. Thus, automobiles which emit reduced amounts of exhaust gas, and automobiles which emit no exhaust gas are being developed. As one automobile which emits reduced amounts of exhaust gas, there is a hybrid automobile that has combined an internal combustion engine with an electric motor. There are also automobiles which emit no exhaust gas, which use electricity. These automobiles are driven using, as an electric power source, electricity stored in a charge accumulating device such as a secondary cell or a capacitor.

Charge accumulating devices to be mounted in automobiles are required to be small and lightweight, and at the same time be capable of instantaneously charging and discharging massive currents. Thus, they are required to have a high output density. As one of the methods to obtain a high output density, there is a method of reducing resistance of various materials constituting the charge accumulating device (internal resistance of charge accumulating devices).

Generally, charge accumulating devices to be mounted on vehicles have a constitution in which, in order to enhance weight energy density, a positive electrode and negative electrode are formed in the form of a sheet, and the positive electrode and negative electrode are placed in a case in a rolled or laminated state via a separator formed similarly in sheet form. The sheet-formed electrode plate has the structure in which a mixture layer containing an active material has been formed on the surface of a metal foil which is intended to constitute an electric current collector.

In a charge accumulating device, aluminum foil is used in the electric current collector. Aluminum has an oxide coating, composed of aluminum oxide, formed on its surface. In other words, a common electric current collector, composed of aluminum, has an oxide coating. It has also been confirmed that when a charge accumulating device is driven and an electric current collector, composed of aluminum, is subjected to high voltage, a coating having high resistance is formed by reacting with a surrounding electrolytic solution.

Thus, the charge accumulating device had a problem that internal resistance increased due to an oxide coating or a high resistance coating which is formed on the surface of an electric current collector composed of aluminum. If the internal resistance increases, a voltage drop may occur when charging or discharging is conducted at a massive current, resulting in a decrease in the output of the charge accumulating device.

With regard to a passivation coating such as an oxide coating or a high resistance coating, Japanese Unexamined Patent Publication Nos. 7-22606, 2002-298853 and 2004-63156 have been disclosed.

Japanese Unexamined Patent Publication No. 7-22606 discloses that electronically conductive particles having a diameter smaller than the thickness of an aluminum foil are embedded on the surface of the aluminum foil. By embedding the electronically conductive particles in the aluminum foil on increase in internal resistance is suppressed.

Japanese Unexamined Patent Publication No. 2002-298853 discloses applying particulate carbons having a median diameter of 0.8 µm or less on the surface of the electric current collector. By attaching particulate carbons, the formation of a passivation coating at the interface between the electric current collector and an electrode active material or an electrolytic solution is suppressed.

Japanese Unexamined Patent Publication No. 2004-63156 discloses the formation of external surface of the electric current collector with hafnium or a hafnium alloy.

However, in the electric current collectors described in Japanese Unexamined Patent Publication Nos. 7-22606, 2002-298853 and 2004-63156, since the passivation coating on the surface of the aluminum foil has not been removed, i.e. the surface having an oxide coating formed thereon is subjected to further treatment, therefore, there was a problem that a sufficient effect of reducing internal resistance cannot be obtained.

Furthermore, in Japanese Unexamined Patent Publication Nos. 7-22606, 2002-298853 and 2004-63156, the aluminum foil and the conductive surface layer formed thereon have only been conjugated by the anchoring effect of ruggedness on the surface of the aluminum foil, and thus there was a problem in terms of durability and reliability.

On the other hand, Japanese Unexamined Patent Publication No. 2000-243383 discloses that the oxide coating is removed by polishing the surface of the aluminum foil in an oxygen-free atmosphere and then an active material layer is formed in the oxygen-free atmosphere. Even in the method disclosed in Japanese Unexamined Patent Publication) No. 2000-243383, the conjugation of the active material layer and the aluminum foil (electric current collector) is only by the anchoring effect, and had a problem that the binding strength is weak. Thus, there was a problem that the exposed region of aluminum of the manufactured electrode is oxidized, and thus enhancement in internal resistance is induced.

As an example of an aluminum foil having an electrically conductive material disposed on its surface, there is a product (trade name: Toyalcarbo, manufactured by TOYO ALUMINIUM K. K.) in which a carbon whisker was formed on an aluminum foil, using aluminum carbide as the seed crystal. However, aluminum carbide having high resistance exists between a carbon whisker and aluminum foil in this product, and the carbon whisker and aluminum foil are not directly bound, and thus the product had problems in terms of durability and reliability.

As described above, in aluminum foils used in the electric current collectors of conventional charge accumulating devices, there have been concerns regarding enhancement in internal resistance, and over durability and reliability because of the presence of an oxide coating on the surface.

SUMMARY OF INVENTIONS

The present invention has been achieved by taking into consideration the above problems, and it is an object of the invention to provide an electric current collector in which the effect of the passivation coating on the aluminum surface is suppressed, and a charge accumulating device which uses the electric current collector.

In order to solve the above problems, the present inventors have formed a junction layer in which an electrically conductive material is mixed on the surface of an electric current collector composed of aluminum, and have found that by forming an electrical conductor layer comprising an electrically conductive material on the surface, the above problems can be resolved.

Thus, the electric current collector of the present invention is characterized in that it has a substrate composed of aluminum, a junction layer, formed on a surface of the substrate, in which aluminum and an electrically conductive material having electrical conductivity have been mixed, and an electrical conductor layer, formed on the junction layer, comprising the electrically conductive material.

The electrode of the present invention is characterized in that it has a substrate composed of aluminum, a junction layer, formed on a surface of the substrate, in which aluminum and an electrically conductive material having electrical conductivity have been mixed, an electrical conductor layer, formed on the junction layer, comprising the electrically conductive material, and an active material layer, formed on the electrical conductor layer, containing an electrode active material which is capable of occluding and releasing ions, capable of donating and accepting electrons associated with an oxidation-reduction reaction, or capable of reversibly storing electric charges The charge accumulating device of the present invention is a charge accumulating device that uses the above electric current collector, and is characterized in that an electrode plate formed from an electric current collector described below is employed therein.

In the electric current collector of the present invention, enhancement in internal resistance due to a passivation coating has been suppressed, and decrease in the output characteristics of a charge accumulating device due to enhanced internal resistance has been suppressed. By having a junction layer, no detachment of the electrical conductor layer occurs, and thus an electric current collector having excellent durability and reliability is provided.

The electrode of the present invention is an electrode that employs an electric current collector in which enhancement in internal resistance due to a passivation coating has been suppressed, and thus a charge accumulating device, in which decrease in the output characteristics thereof due to enhanced internal resistance has been suppressed, can be obtained. By having a junction layer, no detachment of the electrical conductor layer occurs, and thus an electrode having excellent durability and reliability is provided.

DETAILED DESCRIPTION

[Electric Current Collector]

Figure 1:
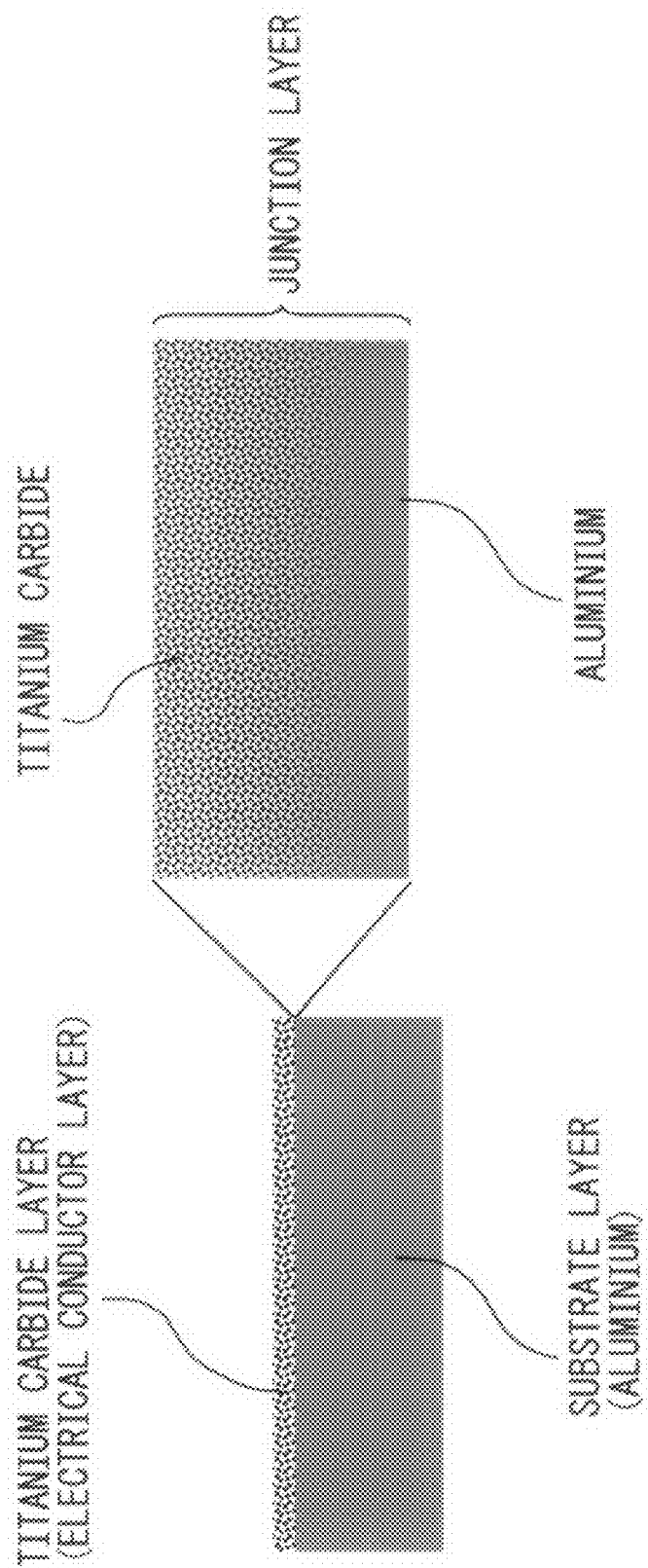
FIG. 1 shows a drawing to illustrate a constitution of the cross section of the electric current collector of Example 1.

The electric current collector of the present invention has a substrate composed of aluminum, a junction layer, formed on the surface of the substrate, in which aluminum and an electrically conductive material having electrical conductivity have been mixed, and an electrical conductor layer, formed on the junction layer, having the electrically conductive material.

In the electric current collector of the present invention, the surface has been formed by an electrical conductor layer comprising an electrically conductive material with electrical conductivity. By having the electrical conductor layer, aluminum which constitutes the substrate is not exposed to an organic electrolytic solution when an electrode in a charge accumulating device which has employed the organic electrolytic solution is formed, and thus a passivation coating (high resistance coating) will not be formed. Enhancement in internal resistance due to a passivation coating can be suppressed, and decrease in the output characteristics of the charge accumulating device due to enhanced internal resistance can be suppressed.

In the electric current collector of the present invention, an oxide coating on the aluminum surface has been removed when a junction layer comprising aluminum and an electrically conductive material mixed therein is formed. In other words, in the electric current collector of the present invention, enhancement in internal resistance due to a passivation coating on the aluminum surface has been suppressed.

Furthermore, in the electric current collector of the present invention, the substrate and the electrical conductor layer have been joined via the junction layer. In the junction layer, aluminum that constitutes the substrate and the electrically conductive material which exhibits electrical conductivity in the electrical conductor layer have been mixed, and thus it is possible to use similar materials in junctions between the junction layer and the substrate and between the substrate junction layer and the electrical conductor layer, and thereby to bind tightly. Therefore, even by using an electric current collector in a charge accumulating device, detachment of the electrical conductor layer will not occur, and an electric current collector having excellent durability and reliability can be provided.

The junction layer is preferably formed by an electrically conductive material which is diffused from the surface to the inside of the substrate. By the diffusion of the electrically conductive material from the surface to the inside of the substrate, higher amounts of the electrically conductive material are contained in the vicinity of the surface of the junction layer, and the ratio of the electrically conductive material contained therein gradually decreases from the surface to the inside of the substrate. By employing such a constitution, the substrate and electrical conductor layer can be tightly bound. Thus, in the junction layer, the concentration of the electrically conductive material preferably increases from the side of the substrate to the side of the electrical conductor layer. Also, by diffusing the electrically conductive material in the substrate, the interface between the substrate and the junction layer no longer exists, thereby enhancing the electrical conductivity of the electric current collector. The electrically conductive material is preferably diffused at a molecular level in the aluminum matrix constituting the substrate.

Also, by diffusing an electrically conductive material in the substrate to form a junction layer, an oxide coating present on the surface of aluminum constituting the substrate is removed when the electrically conductive material is diffused, and enhancement in internal resistance due to the oxide coating can be suppressed.

The junction layer is preferably formed at a thickness of 0.01 μm or greater. The thickness of the junction layer as used herein means a thickness of the region in which the electrically conductive material is contained. By forming the junction layer at a thickness of 0.01 μm or greater, the effect of joining the substrate and the electrical conductor layer can be exhibited.

The substrate is preferably formed at a thickness of 30 μm or less. If the thickness of the substrate exceeds 30 μm, the thickness of the electric current collector becomes too large. If the thickness of the electric current collector is too large, the ratio occupied by the substrate in the electrode becomes higher when forming a charge accumulating device, and the amount of the active material per volume becomes decreased, which leads to reduced volume efficiency.

In the electric current collector of the present invention, the quality of the electrically conductive material is not specifically limited, and can be selected as appropriate depending on the electrolytic solution and the condition of use, etc., when used in the charge accumulating device. A passivation coating formed on the aluminum surface varies, depending on the electrolytic solution and the condition of use, etc., of the charge accumulating device in which the electric current collector is used. For example, an electrolytic solution containing $LiPF_6$ as the electrolyte is used in a lithium ion battery, and a passivation coating created at about 4V in the electric current collector of this lithium ion battery is aluminum fluoride. Thus, the quality of the material and the thickness of a passivation coating formed vary depending on the type and electric potential of an electrolytic solution to which the electric current collector is exposed in the charge accumulating device. Thus, the quality of an electrically conductive material may be selected as appropriate based on the type and electric potential of the electrolytic solution to which the electric current collector is exposed in the charge accumulating device. For example, there can be mentioned at least one of a carbon material, an electrically conductive ceramic, an electrically conductive oxide, and a metallic material. Alternatively, a combination thereof may be used.

The carbon material is preferably at least one of graphite, carbon black, acetylene black, and carbon nanotube. The electrically conductive ceramic is preferably at least one of titanium carbide and titanium nitride. The electrically conductive oxide is preferably at least one of vanadium oxide, titanium oxide, niobium oxide, cobalt oxide, manganese oxide, nickel oxide, silver oxide, zinc oxide, and tungsten oxide. The metallic material is at least one of nickel, silver, gold, and platinum.

By selecting a carbon material, an electrically conductive ceramic, an electrically conductive oxide, and a metallic material from the above materials, the electrical conductor layer can have electrical conductivity without enhancing internal resistance.

In the electric current collector of the present invention, aluminum that constitutes the substrate may be not only pure aluminum but also an aluminum alloy. For example, the strength of an aluminum alloy containing manganese is improved, and thus the thickness of the substrate can be rendered thinner. Preferably, the substrate has not been subjected to heat treatment, such as annealing.

The electric current collector of the present invention is not limited in the method of manufacturing, as long as it can form a substrate, a junction layer and an electrical conductor layer. For example, there can be mentioned a manufacturing method in which an electrically conductive material is sprayed on and diffused in the substrate. At this time, aluminum constituting the substrate is preferably kept at a temperature lower than ordinary temperature, since aluminum is easily oxidized.

[Electrode]

The electrode of the present invention has a substrate composed of aluminum, a junction layer, formed on the surface of the substrate, in which aluminum and an electrically conductive material having electrical conductivity have been mixed, and an active material layer, formed on the electrical conductor layer, comprising an electrode active material which is capable of occluding and releasing ions, capable of donating and accepting electrons associated with an oxidation-reduction reaction, or capable of reversibly storing electric charges. Thus, the electrode of the present invention is an electrode in which an active material layer has been formed on the junction layer of the above electric current collector.

The electrode of the present invention is an electrode that employs the above electric current collector in which an electrical conductor layer has been formed on the surface of the substrate composed of aluminum, enhancement in internal resistance has been suppressed, and thus the electrode exhibits its high durability and reliability.

The electrode of the present invention is an electrode which employs the above electric current collector, and also an electrode which has an active material layer on the electrical conductor layer. The active material layer comprises an electrode active material which is capable of occluding and releasing ions, capable of donating and accepting electrons associated with an oxidation-reduction reaction, or capable of reversibly storing electric charges. The electrode active material is a substance which produces an electrode reaction when the electrode of the present invention is used as the electrode of a charge accumulating device. The electrode reaction produced by an electrode active material is not limited, and there can be mentioned a reaction in which ions are occluded into and released from the crystal structure as in the reaction of a lithium battery, a reaction in which electrons associated with an oxidation-reduction reaction are donated and accepted as in a radical battery, and a reaction in which an electric double layer is formed on the surface as in an electric double layer capacitor.

The electrode of the present invention may be used in the positive electrode or negative electrode. For example, when it is used as an electrode of a lithium ion battery, it is preferably a positive electrode.

In the electrode of the present invention, the electrode active material is not specifically limited as long as it is a substance that, when a charge accumulating device is constituted, produces at least one of an electrode reaction that occludes and releases ions, an electrode reaction that donates and accepts electrons associated with an oxidation-reduction reaction, and an electrode reaction that carries ions reversibly. The electrode active material is preferably at least one of a metal oxide base compound and a radical compound.

The metal oxide base compound is any metal oxide base compound which is capable of occluding and releasing ions. By allowing the metal oxide base compound to be composed of a compound which is capable of occluding and releasing lithium ions, a lithium ion battery can be formed using the electrode of the present invention. As the metal oxide base compound, there can be mentioned a compound containing a cobalt base oxide, a nickel base oxide, a manganese base oxide or an iron olivinate base oxide, or a complex oxide thereof, in a metal oxide base compound which is capable of occluding and releasing lithium ions. Thus, the metal oxide base compound is preferably a compound comprising at least one of a cobalt base oxide, a nickel base oxide, a manganese base oxide and an iron olivinate base oxide, or a complex oxide thereof, in a metal oxide base compound which is capable of occluding and releasing lithium ions. More specifically, there can be illustrated one or more of lithium transition metal oxides such as $LiCoO_2$, $LiNiO_2$, $LiMnO_2$, $LiMn_2O_4$ and $LiNi_{1-x-y}Co_xM_yO_2$ (M is a metal element such as Al, Sr, Mg and La) or a complex thereof.

Radical compounds have unpaired electrons which are used in an electrode reaction. Thus, the unpaired electrons are extracted as an electric current via the electric current collector. As a result, an electrode reaction proceeds, which donates and accepts electrons associated with an oxidation-reduction reaction. A charge accumulating device which employs this electrode reaction exhibits an effect of obtaining a high output due to easiness of donating and accepting electrons. Radical compounds are not specifically limited as long as they are compounds having unpaired electrons that contribute to the electrode reaction. Radical compounds are preferably at least one of compounds having a nitroxyl radical, compounds having an oxy radical, and compounds having a nitrogen radical.

As an electrode reaction which can reversibly store electric charges, a reaction that occurs at the electrode of the capacitor can be mentioned. As an active material layer which can reversibly store electric charges, an active material conventionally used in known capacitors can be mentioned, and for example there is a carbon material such as activated charcoal.

In the electrode of the present invention, the thickness of the junction layer is preferably 0.01 µm or greater. As used herein, the thickness of the junction layer means the thickness of the region in which the electrically conductive material is contained. By forming the junction layer at a thickness of 0.01 µm or greater, the effect of joining the substrate and the electrical conductor layer can be exhibited.

The substrate is preferably formed at a thickness of 30 µm or less. If the thickness of the substrate exceeds 30 µm, the thickness of the electric current collector becomes too large. If the thickness of the electric current collector becomes large, the ratio occupied by the substrate in the electrode becomes higher when forming a charge accumulating device, and the amount of the active material per volume becomes decreased, which leads to reduced volume efficiency.

In the electrode of the present invention, the quality of the electrically conductive material is not specifically limited, and can be selected as appropriate depending on the electrolytic solution, the condition of use thereof, and etc., when used in the charge accumulating device. The passivation coating formed on the aluminum surface varies, depending on the electrolytic solution, the condition of use, and etc. of the charge accumulating device in which the electric current collector is used. For example, an electrolytic solution containing $LiPF_6$ as the electrolyte is used in an lithium ion battery, and a passivation coating created at about 4V on the surface of the electric current collector is aluminum fluoride. Thus, the quality of the material and the thickness of the passivation coating formed therein vary depending on the type and electric potential of an electrolytic solution to which the electric current collector is exposed in the charge accumulating device. Thus, the quality of an electrically conductive material may be selected as appropriate based on the type and electric potential of the electrolytic solution to which the electric current collector is exposed in the charge accumulating device. For example, there can be mentioned at least one of a carbon material, an electrically conductive ceramic, an electrically conductive oxide, and a metallic material. Alternatively, a combination thereof may be used.

The carbon material is preferably at least one of graphite, carbon black, acetylene black, and carbon nanotube. The electrically conductive ceramic is preferably at least one of titanium carbide and titanium nitride. The electrically conductive oxide is preferably at least one of vanadium oxide, titanium oxide, niobium oxide, cobalt oxide, manganese oxide, nickel oxide, silver oxide, zinc oxide, and tungsten oxide. The metallic material is at least one of nickel, silver, gold, and platinum.

By selecting a carbon material, an electrically conductive ceramic, an electrically conductive oxide, and a metallic material from the above materials, the electrical conductor layer can have electrical conductivity without enhancing internal resistance.

In the electrode of the present invention, aluminum that constitutes the substrate may be not only pure aluminum but also an aluminum alloy. For example, the strength of an aluminum alloy containing manganese is improved, and thus the thickness of the substrate can be rendered thinner. Preferably the substrate has not been subjected to a heat treatment such as annealing.

The electrode of the present invention is not limited in the method of manufacturing as long as it can form an active material layer on the electrical conductor layer of the electric current collector. For example, there can be mentioned a manufacturing method in which an electric current collector having a substrate, a junction layer and an electrical conductor layer is manufactured, and a paste comprising an electrode active material is applied on the electrical conductor layer and dried to form an active material layer. After a paste comprising an electrode active material is applied on the electrical conductor layer and dried, the active material layer may be compressed by pressing.

[Charge Accumulating Device]

The charge accumulating device of the present invention is a charge accumulating device which employs the above electric current collector, and employs an electrode plate formed from the electric current collector described above. Since the above electrode employs the above electric current collector, the charge accumulating device of the present invention preferably employs the electrode described above. The charge accumulating device is a device which is capable of charging and discharging electricity such as a secondary battery or a capacitor. In the above electric current collector, an electrical conductor layer has been formed on the surface of a substrate composed of aluminum, and decrease in performance of charging and discharging due to a passivation coating has been suppressed. Also, since the charge accumulating device of the present invention is a device that employs the above electric current collector, enhancement in internal resistance has been suppressed, and it has excellent durability and reliability.

The charge accumulating device of the present invention can have a constitution similar to a conventionally known charge accumulating device except for the above-mentioned electric current collector.

Thus, the charge accumulating device may take a constitution in which an electrode body is formed using an electrode produced with the above electric current collector, and then the electrode body is tightly enclosed in a container together with a non-electrolytic solution.

The charge accumulating device of the present invention is preferably a secondary battery. The type of the secondary battery is not specifically limited as long as it is capable of repeatedly charging and discharging, and any conventionally known secondary battery can be used. For example, there can be mentioned a secondary battery such as a lithium battery that uses an organic electrolytic solution as the electrolytic solution. The secondary battery is preferably a non-aqueous secondary battery, since it has a high energy density. As the non-aqueous secondary battery, for example, a lithium ion battery may be mentioned, and in the lithium ion battery, the above electric current collector is preferably used as the electric current collector for the positive electrode.

The charge accumulating device of the present invention is preferably a capacitor. The type of the capacitor is also not specifically limited as long as it is capable of repeatedly charging and discharging, and any conventionally known capacitor can be used. The capacitor is preferably an electric double layer type capacitor that has an excellent high-speed response during charging and discharging.

The secondary battery and the capacitor may be a single battery having one electrode body, or a combined battery set comprising a plurality of single batteries. Alternatively, it may be a single cell battery in which one electrode body has been housed in a case, or a multiple cell battery in which a plurality of electrode bodies have been housed in one.

EXAMPLES

The present invention will now be explained with reference to specific examples.

As an example of the present invention, an electric current collector composed of aluminum and a positive electrode were manufactured.

Example 1

First, an aluminum foil (manufactured by NIPPON FOIL MFG. CO., LTD., 1N30 Material pursuant to the provisions in JIS) comprising a H material, a cold rolled material which is not annealed, having a thickness of 15 μm was prepared. This aluminum foil has not been subjected to a heat treatment.

This aluminum foil was fixed on the surface of a porous ceramic material. From the back surface side of the ceramic material, an aluminum foil was intimately attached onto the ceramic by evacuation.

Titanium carbide particles (manufactured by SHINNI-HONKINZOKUKOGYO CO., LTD.) with a mean particle size of 1.5 μm were sprayed under ordinary temperature onto the surface of the aluminum foil intimately attached on the surface of the ceramic material. The spraying of the titanium carbide particles was performed by scanning the nozzle, until a titanium carbide coating (titanium carbide layer) was formed on an area of a 50 mm square on the surface of the aluminum foil. The maximum flow rate of the titanium carbide particles during spraying was 400 m/s.

Thus, the electric current collector of Example 1 was manufactured.

When the cross section of the electric current collector of Example 1 was examined with a transmission electron microscope (TEM), it was confirmed that a titanium carbide layer (an electrical conductor layer) was formed at a thickness of 0.3 to 0.5 μm from the surface, and a junction layer in which titanium carbide was diffused (mixed) in aluminum was formed at a thickness of 0.1 μm, and the rest was formed with a substrate layer composed of aluminum.

It was confirmed that the ratio of titanium carbide contained therein gradually increases from the substrate layer side to the titanium carbide layer in the junction layer. Also, no passivation coating was confirmed in the interface between the titanium carbide layer and the junction layer or the interface between aluminum and the titanium carbide layer in the junction layer. The cross is section of the electric current collector of this Example is schematically shown in FIG. 1.

Example 2

An electric current collector of this Example was manufactured in a manner similar to Example 1 except that particles sprayed onto the surface of the aluminum foil were graphite particles having a mean particle size of 2 μm.

When the cross section of the electric current collector of this Example was examined with a transmission electron microscope (TEM), it was confirmed that a graphite layer (an electrical conductor layer) was formed at a thickness of 0.3 to 0.5 μm from the surface, and a junction layer in which graphite was diffused (mixed) in aluminum was formed at a thickness of 0.15 to 0.3 μm in the inside of a graphite layer, and the rest was formed with a substrate layer composed of aluminum.

Figure 2:
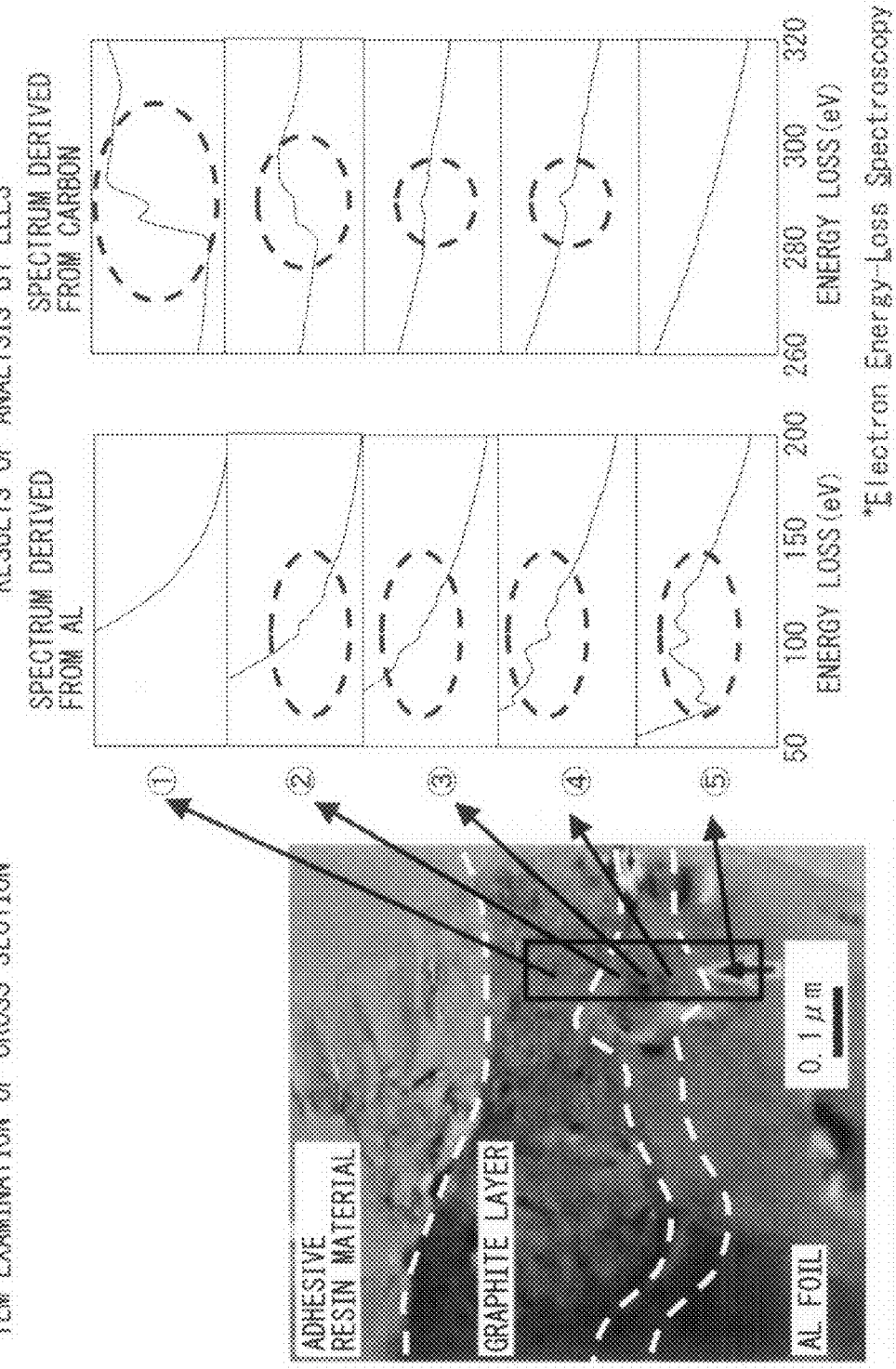
FIG. 2 shows a drawing of observation by TEM that illustrates the cross section of the electric current collector of Example 2.

It was confirmed by the electron energy-loss spectroscopy (EELS) that the ratio of graphite contained therein gradually increases from the substrate layer side to the graphite layer in the junction layer (FIG. 2). Also, no passivation coating was confirmed in the interface between the graphite layer and the junction layer or the interface between aluminum and the graphite layer in the junction layer.

Comparative Example 1

Figure 3:
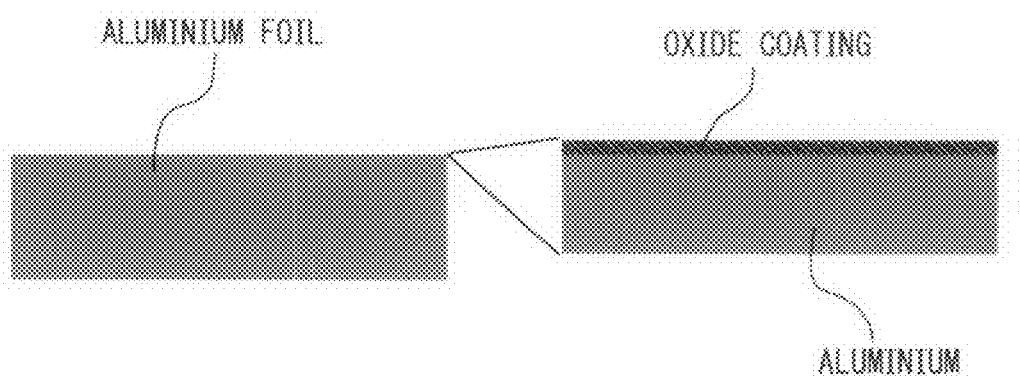
FIG. 3 shows a drawing that illustrates a constitution of the cross section of the electric current collector of Comparative Example 1.

This Comparative example comprises an aluminum foil used in Examples 1 and 2. The electric current collector of this Comparative example has been preserved in the atmospheric air at ordinary temperature, and a passivation coating comprising an oxide coating has been formed on its surface. The cross section of the electric current collector of this Comparative example is schematically shown in FIG. 3.

Comparative Example 2

First, titanium carbide particles similar to those used in Example 1 were dispersed in ethanol (alcohol). Then, this solution was applied on the surface of the aluminum foil used in the manufacture in Examples 1 and 2, which was then dried. The application of the solution onto the surface of the aluminum foil and drying were repeated until titanium carbide particles coated the surface of the aluminum foil.

After drying, the titanium carbide particles were pressed against the aluminum foil at a pressure of 2 MPa by a hand press machine.

In this way, the electric current collector of this Comparative example was manufactured.

Figure 4:
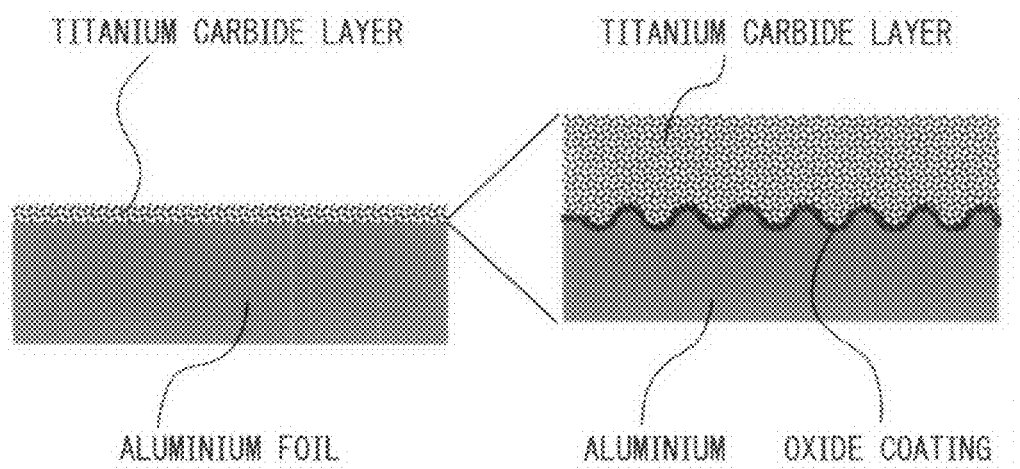
FIG. 4 shows a drawing that illustrates a constitution of the cross section of the electric current collector of Comparative Example 2.

When the cross section of the electric current collector of this Comparative example was examined with a transmission electron microscope (TEM), it was confirmed that a titanium carbide layer was formed at a thickness of 1 μm on the surface of the aluminum foil. Also, the formation of a passivation coating was confirmed at the interface of the titanium carbide layer and the junction layer. The cross section of the electric current collector of this Comparative example is schematically shown in FIG. 4.

[Evaluation]

As the evaluation of the electric current collectors of Examples 1 and 2 and Comparative examples 1 and 2, positive electrodes of lithium ion batteries and lithium ion batteries for test using these positive electrodes were manufactured from these electric current collectors, and, after applying a high voltage, contact resistance was measured.

[Manufacture of the Positive Electrode]

Lithium nickelate ($LiNiO_2$) as the positive-electrode active material, polytetrafluoroethylene (PTFE) and carboxymethyl cellulose (CMC) as the binder, and carbon black as the electrically conductive auxiliary material were weighed out at their respective predetermined amounts, and dispersed in water, a dispersing medium, to prepare a positive-electrode combined paste.

The positive-electrode combined paste thus prepared was applied on the surface of the electric current collector and dried. Then, it was pressed with a hand press machine to make higher the density of the electrode active material on the surface of the electric current collector plate. Thus, a positive electrode in which a positive-electrode active material layer was formed on the surface of the electric current collector was manufactured.

[Manufacture of the Negative Electrode]

Carbon black as the negative-electrode active material, styrene-butadiene rubber (SBR) and carboxymethyl cellulose (CMC) as the binder were weighed out at their respective predetermined amounts, and dispersed in water, a dispersing medium, to prepare a negative-electrode combined paste.

The negative-electrode combined paste thus prepared was applied on the surface of the electric current collector composed of a copper foil and dried. Thus, a negative electrode in which a negative-electrode active material layer was formed on the surface of the electric current collector was manufactured.

[Test Battery]

The above positive electrode and negative electrode were laminated via a separator composed of a polyethylene porous film, inserted into a battery case composed of aluminum along with an electrolytic solution, and the mouth of the case was sealed to manufacture a test battery. The electrolytic solution was prepared by adding $LiPF_6$ at 1 mol/L into a mixed solvent in which ethylene carbonate (EC), dimethyl carbonate (DMC) and ethylmethyl carbonate (EMC) were mixed at a volume ratio of 1:1:1.

[Application of a High Voltage]

Subsequently, a test battery was connected to an electrode of the test device, and after charging to 4.1 V, the battery was allowed to stand for 500 hours. After letting the test battery stand, it was discharged.

[Measurement of Contact Resistance]

After the application of a high voltage, the positive electrode was removed, washed and dried. The dried positive electrode was cut up into a disk of φ 15 mm, and sandwiched between two copper materials. Then the two copper materials were pressed at a pressure of 1 MPa, and the positive electrode was pressed to each of the two copper materials.

A constant current was applied in between the two copper materials, and the voltage was measured. The result of measurement is shown in Table 1. In Table 1, the measured values are shown at a ratio when the voltage for Comparative example 1 is set at 1.0.

TABLE 1

|  | Voltage ratio |
|---|---|
| Comparative example 1 | 1.0 |
| Example 1 | 0.1 |
| Example 2 | 0.1 |
| Comparative example 2 | 0.4 |

As shown in Table 1, the contact resistances (internal resistance) of the electric current collectors of Examples 1 and 2 having an electrical conductor layer on the surface are significantly decreased compared to the electric current collector of Comparative example 1. And the contact resistances of the electric current collectors of Examples 1 and 2 having a junction layer are significantly decreased compared to the electric current collector of Comparative example 2. Thus, since a passivation coating is no longer present at the interface of aluminum and titanium carbide or graphite, the internal resistance decreased.

As described above, in the electric current collectors of Examples 1 and 2, enhancement in internal resistance due to a passivation coating has been suppressed, and decrease in the output characteristics of the charge accumulating device due to enhanced internal resistance has been suppressed. Also, detachment of the electrical conductor layer from the junction layer disappeared, thereby providing an electric current collector having excellent durability and reliability.

From the electric current collector of Example 1, not only the positive electrode for a lithium battery described above but a positive electrode for a lithium battery described below can be manufactured.

Example 3

First, an electric current collector was manufactured in a method similar to that in Example 1.

Subsequently, 87 parts by weight of $LiNiO_2$ as the positive-electrode active material, 10 parts by weight of graphite, 1 part by weight of CMC and 1 part by weight of polyethylene oxide (PEO) as the electrically conductive auxiliary material, and 1 part by weight of PTFE as the binder were prepared, and were dispersed in water to prepare a positive-electrode combined paste.

The positive-electrode combined paste thus prepared was applied on both surfaces of an electric current collector, kept at 80° C. for 30 minutes, and then dried. It was pressed with a hand press machine at a pressure of 12 kN. By pressing, the density of the electrode combined material on the surface of the electric current collector plate became 2 g/cm$^3$.

In this way, a positive electrode for the lithium battery of this Example was manufactured.

Example 4

First, an electric current collector was prepared in a manner similar to that in Example 1.

Subsequently, 64 parts by weight of a stable radical compound, 2,2,6,6-tetramethyl piperidinoxy methacrylate (PTMA) as the positive-electrode active material, 33 parts by weight of graphite, 1 part by weight of CMC and 1 part by weight of polyethylene oxide (PEO) as the electrically conductive auxiliary material, and 1 part by weight of PTFE as the binder were prepared, and were dispersed in water to prepare a positive-electrode combined paste.

The positive-electrode combined paste thus prepared was applied on both surfaces of an electric current collector, kept at 70° C. for 40 minutes, and then dried. It was pressed with a hand press machine at a pressure of 12 kN. By pressing, the density of the electrode combined material on the surface of the electric current collector plate became 2 g/cm$^3$.

In this way, a positive electrode for the lithium battery of this Example was manufactured.

Comparative Example 3

This Comparative example is a positive electrode for the lithium battery manufactured in a manner similar to that in Example 3, except that the aluminum foil used in Example 1 was used as the electric current collector.

Comparative Example 4

This Comparative example is a positive electrode for the lithium battery manufactured in a manner similar to that in Example 4 except that the aluminum foil used in Example 1 was used as the electric current collector.

[Evaluation]

As the evaluation of the electrodes of Examples 3 and 4 and Comparative examples 3 and 4, the contact resistance of the electrode was measured in a manner similar to Example 1. The result of measurement is shown in Table 2. In Table 2, the measured values of Examples 3 and 4 are shown at a ratio when the voltage for Comparative example 3 is set at 1.0.

TABLE 2

|  | Voltage ratio |
| --- | --- |
| Comparative example 3 | 1.0 |
| Example 3 | 0.1 |
| Example 4 | 0.05 |

As shown in Table 2, the measured contact resistance of the positive electrodes in Examples 3 and 4 were lower than that of Comparative example 3. Though simple comparison cannot be made since active materials are different in Example 4 and Comparative example 3, contact resistance in Example 4 is significantly decreased compared to Comparative example 3. Thus, in Examples 3 and 4, enhancement in internal resistance due to a passivation coating of the electric current collector plate has been suppressed, and decrease in the output characteristics of the charge accumulating device due to enhanced internal resistance has been suppressed. Also, detachment of the electrical conductor layer from the junction layer of the electric current collector plate disappeared, thereby providing an electrode having excellent durability and reliability.

We claim:

1. An electric current collector comprising:
a substrate composed of aluminum,
a junction layer, formed on a surface of said substrate, in which aluminum and an electrically conductive material having electrical conductivity have been mixed, and
an electrical conductor layer, formed on said junction layer, comprising said electrically conductive material; wherein
a higher amount of said electrically conductive material is contained in a surface of said junction layer opposite to said surface of said substrate than a portion of said junction layer adjacent said surface of said substrate; and
a ratio of the electrically conductive material to said aluminum gradually decreases from the surface of said junction layer to said surface of said substrate.

2. The electric current collector according to claim 1, wherein said junction layer has been formed by diffusing said electrically conductive material from the surface to the inside of said substrate.

3. The electric current collector according to claim 1, wherein said junction layer has been formed at a thickness of 0.01 μm or greater.

4. The electric current collector according to claim 1, wherein said substrate has been formed at a thickness of 30 μm or less.

5. The electric current collector according to claim 1, wherein said electrically conductive material is composed of at least one of a carbon material, an electrically conductive ceramic, an electrically conductive oxide and a metallic material.

6. The electric current collector according to claim 5, wherein said carbon material is at least one of graphite, carbon black, acetylene black and carbon nanotube.

7. The electric current collector according to claim 5, wherein said electrically conductive ceramic is at least one of titanium carbide and titanium nitride.

8. The electric current collector according to claim 5, wherein said electrically conductive oxide is at least one of vanadium oxide, titanium oxide, niobium oxide, cobalt oxide, manganese oxide, nickel oxide, silver oxide, zinc oxide and tungsten oxide.

9. The electric current collector according to claim 5, wherein said metallic material is at least one of nickel, silver, gold and platinum.

10. An electrode comprising:
a substrate composed of aluminum,
a junction layer, formed on a surface of said substrate, in which aluminum and an electrically conductive material having electrical conductivity have been mixed,
an electrical conductor layer, formed on said junction layer, comprising said electrically conductive material, and
an active material layer, formed on said electrical conductor layer, containing an electrode active material which is capable of occluding and releasing ions, capable of donating and accepting electrons associated with an oxidation-reduction reaction, or capable of reversibly storing electric charges; wherein
a higher amount of said electrically conductive material is contained in a surface of said junction layer opposite to said surface of said substrate than a portion of said junction layer adjacent said surface of said substrate; and
a ratio of the electrically conductive material to said aluminum gradually decreases from the surface of said junction layer to said surface of said substrate.

11. The electrode according to claim 10, wherein said junction layer has been formed by diffusing said electrically conductive material from the surface to the inside of said substrate.

12. The electrode according to claim 10, wherein said junction layer has been formed at a thickness of 0.01 μm or greater.

13. The electrode according to claim 10, wherein said substrate has been formed at a thickness of 30 μm or less.

14. The electrode according to claim 10, wherein said electrically conductive material is composed of at least one of a carbon material, an electrically conductive ceramic, an electrically conductive oxide, and a metallic material.

15. The electrode according to claim 14, wherein said carbon material is at least one of graphite, carbon black, acetylene black, and carbon nanotube.

16. The electrode according to claim 14, wherein said electrically conductive ceramic is at least one of titanium carbide and titanium nitride.

17. The electrode according to claim 14, wherein said electrically conductive oxide is at least one of vanadium oxide, titanium oxide, niobium oxide, cobalt oxide, manganese oxide, nickel oxide, silver oxide, zinc oxide and tungsten oxide.

18. The electrode according to claim 14, wherein said metallic material is at least one of nickel, silver, gold and platinum.

19. The electrode according to claim 10, wherein said electrode active material is at least one of a metal oxide base compound and a radical compound.

20. The electrode according to claim 19, wherein said metal oxide base compound is a compound containing at least one of a cobalt base oxide, a nickel base oxide, a manganese base oxide, and an iron olivinate base oxide or a complex thereof in a metal oxide base compound which is capable of occluding and releasing lithium ions.

21. The electrode according to claim 19, wherein said radical compound is at least one of a compound having a nitroxyl radical, a compound having an oxy radical, and a compound having a nitrogen radical.

* * * * *